United States Patent [19]

Davis

[11] 3,852,079
[45] Dec. 3, 1974

[54] BAO-CAO-AL$_2$O$_3$ GLASS COMPOSITIONS
[75] Inventor: Robert F. Davis, Cary, N.C.
[73] Assignee: Corning Glass Works, Corning, N.Y.
[22] Filed: Oct. 20, 1972
[21] Appl. No.: 299,628

[52] U.S. Cl. .............................. 106/50, 106/47 R
[51] Int. Cl. ............................................. C03c 13/00
[58] Field of Search .................. 106/50, 47 R, 47 Q

[56] References Cited
UNITED STATES PATENTS

| | | | |
|---|---|---|---|
| 3,007,804 | 11/1961 | Kreidl | 106/47 X |
| 3,545,639 | 12/1970 | Charles | 106/47 X |
| 3,635,739 | 1/1972 | MacDowell | 106/47 X |
| 3,687,850 | 8/1972 | Gagin | 106/50 X |

OTHER PUBLICATIONS

Florence, F. M., et al.; Transmittance of Some Calcium Aluminate and Germanate Glasses, Journ. of Research Nat'l. Bur. Stds. 55 (1955) pp. 231–237.

Primary Examiner—Winston A. Douglas
Assistant Examiner—John F. Niebling
Attorney, Agent, or Firm—Kees van der Sterre; Clarence R. Patty, Jr.

[57] ABSTRACT

Glasses in the BaO-CaO-Al$_2$O$_3$ composition system useful in the manufacture of refractory glass fibers and wools for insulation and metal casting applications wherein silica-containing wools and fibers pose a health hazard are described.

6 Claims, 2 Drawing Figures

BAO-CAO-AL$_2$O$_3$ GLASS COMPOSITIONS

BACKGROUND OF THE INVENTION

It is known that a small glass-forming region exists in the BaO-CaO-Al$_2$O$_3$ composition system. For example, F. M. Florence et al. in "Infrared Transmittance of Some Calcium Aluminate and Germanate Glasses," Journal of Research of the National Bureau of Standards, Vol. 55, pp. 231–237 (1955), describe the infrared light-transmitting properties of several compositions in this field. H. C. Hafner et al. in "Optical and Physical Properties of Some Calcium Aluminate Glasses." American Ceramic Society Journal, Vol. 41, pp. 315–323 (1958) also report the melting of several such compositions, with and without additives such as alkali and alkaline earth metal oxides, and the resulting optical properties of these glasses.

The information obtained from these and other prior art references suggest that the glass-forming region in the BaO-CaO-Al$_2$O$_3$ composition system is small and rather well defined, and that most known BaO-CaO-Al$_2$O$_3$ melts devitrify readily and are difficult to form without some crystallization. Yet the refractory nature of BaO-CaO-Al$_2$O$_3$ glasses is an important property which could be utilized in a variety of high-temperature applications, provided good glass-forming compositions and means for forming them into useful articles could be devised.

SUMMARY OF THE INVENTION

I have now discovered an area of BaO-CaO-Al$_2$O$_3$ glass composition useful in the production of glass fibers or wool for high-temperature applications. Notwithstanding the fact that the discovered composition area is outside the region previously thought to be useful for glass-making, the fibers are of good glass quality and have excellent refractory properties. Thus they are useful in high temperature insulation and molten metal casting applications as a substitute for injurious asbestos fibers or other silica-containing materials.

The newly discovered BaO-CaO-Al$_2$O$_3$ composition area is shown in FIG. 1 of the DRAWING as the region bounded by the polygon ABCDEFGA in the BaO-CaO-Al$_2$O$_3$ ternary compositions diagram. The compositions are shown in mole percent on the oxide basis. The bulk of the compositions lie in the region of about 4–18 mole percent BaO, 42–54 mole percent CaO and 32–42 mole percent Al$_2$O$_3$. A minor connected composition area includes compositions consisting essentially, in mole percent on the oxide basis, of about 0–7% BaO, 54–61% CaO, and 39–42% Al$_2$O$_3$.

The described compositions may be melted according to conventional glass-working practice at temperatures in the range from about 1,600°–1,800°C. and may be formed using fiber- and wool-forming processes well known in the art. The product of the manufacturing process is a fibrous glass of a composition within the above-described composition region. The fibers are completely amorphous; however, electron micrographs show phase separation in the unannealed state which occurs during the forming process. This phase separation does not, however, appear to deleteriously affect the strength or other useful properties of the fibrous glass.

The refractory and amorphous properties of the fibrous glass are respectively demonstrated by differential thermal analysis and X-ray diffraction data. The former technique shows crystallization to occur only upon heating at temperatures in excess of about 900°C. Also, the melting points of the products of crystallization are in the 1,250°–1,410°C. range.

DESCRIPTION OF THE PREFERRED EMBODIMENTS

Table I below sets forth a number of examples of glasses coming within the composition ranges hereinabove described. The compositions are given in mole percent on the oxide basis as calculated from the batch.

TABLE I

|    | BaO | CaO | Al$_2$O$_3$ |
|----|-----|-----|-------------|
| 1  | 2   | 58  | 40 |
| 2  | 10  | 54  | 36 |
| 3  | 14  | 54  | 32 |
| 4  | 18  | 50  | 32 |
| 5  | 18  | 48  | 34 |
| 6  | 18  | 44  | 38 |
| 7  | 18  | 42  | 40 |
| 8  | 16  | 42  | 42 |
| 9  | 14  | 44  | 42 |
| 10 | 10  | 48  | 42 |
| 11 | 8   | 50  | 42 |
| 12 | 6   | 52  | 42 |
| 13 | 2   | 56  | 42 |
| 14 | 8   | 52  | 40 |
| 15 | 12  | 52  | 36 |
| 16 | 16  | 48  | 40 |
| 17 | 12  | 48  | 40 |
| 18 | 14  | 48  | 38 |

Batch materials for the above compositions may comprise any ingredients, whether oxides or other compounds, which upon melting to form a glass will be converted to the specified oxides in the proper proportions. The above compositions were prepared by compounding batches consisting of alumina, calcium carbonate and barium carbonate, tumble-mixing for 1 hour to insure homogeneity in the batch, and melting in platinum or platinum-rhodium crucibles for four hours at temperatures in the range from about 1,700°–1,800°C.

The melts prepared as above described were formed into a fibrous glass wool product by pouring the molten glass through a high velocity nitrogen stream which physically separated the molten glass into fibers. The fibers were collected on a steel screen, with successive layers being added until a thick mass of fibers forming a glass wool was obtained. In each case the glass fibers forming the wool were of good quality, free from devitrification and strong enough to resist extensive breakage through handling.

Figure 2:
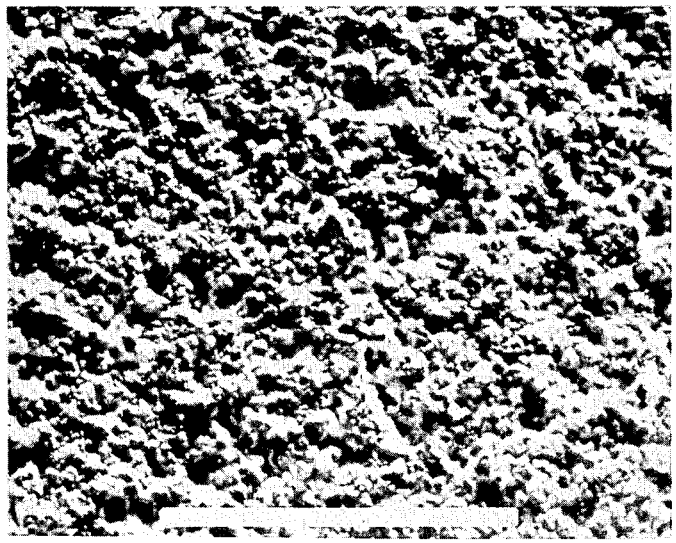
FIG. 2 of the DRAWING is an electron micrograph showing an untreated fracture surface of a bulk glass article of a composition within the scope of the present invention wherein phase separation typical of such compositions is evident.

Glasses within the disclosed composition region were examined with electron microscopy, X-ray diffraction, and differential thermal analysis techniques for the purpose of investigating the microstructure and physical properties thereof. Electron micrograph studies of bulk samples indicate that considerable phase separation occurs during the forming process. FIG. 2 of the DRAWING is an electron micrograph of the untreated fracture surface of a 5 inches × 5 inches × ¼ inch unannealed glass patty of the composition of Example 1 of Table I above. The white bar appearing in the micrograph represents a length of one micron. The rough surface texture which is clearly apparent at this magnification suggests considerable phase separation, although the exact composition of the separated phases has not been determined. This phase separation has also been observed in other compositions shown in Table I, and is believed to be a feature common to all of the compositions within the scope of the present invention.

Powders of the fibrous glasses appearing in Table I were also examined using differential thermal analysis (DTA) techniques to determine the temperature at which crystal formation and subsequent crystal dissolution occur. The DTA data are shown in Table II below for the composition examples from Table I upon which measurements were taken. The crystallization temperatures shown are those temperatures at which rapid formation of crystals commences within the powders as they are heated, and the melting temperatures shown are those temperatures at which melting of the crystals formed at crystallization temmperatures occurs. The crystals formed are believed to be of $3CaO.Al_2O_3$ and $BaO.CaO$ composition.

TABLE II

| Example | Crystallization Temperature (°C) | Melting Temperature (°C.) |
|---|---|---|
| 1 | 970 | 1410 |
| 2 | 940 | 1390 |
| 5 | 900 | 1310 |
| 6 | 910 | 1300 |
| 7 | 910 | 1250 |
| 9 | 960 | 1370 |
| 10 | 980 | 1360 |
| 11 | 980 | 1350 |
| 12 | 970 | 1350 |
| 14 | 970 | 1350 |
| 15 | 940 | 1400 |
| 16 | 925 | 1400 |
| 17 | 940 | 1340 |
| 18 | 930 | 1400 |

Advantages of the fibrous glass for use at high temperatures, in addition to the advantage of being silica-free, include flexibility and a higher devitrification or crystallization temperature than most prior art refractory fibers or wools. Further, for applications where crystallized fibers or wools can be employed, the crystalline phases of the compositions of the invention are expected to demonstrate significantly higher melting temperatures than other prior art glasses which have been crystallized.

The compositions of the present invention are generally higher in alumina than prior art compositions, as well as somewhat higher in baria and somewhat lower in lime, yet their melting and viscosity characteristics are quite well suited for conventional fiber- and wool-forming processes. This is somewhat surprising in view of the fact that high-alumina compositions would be expected to demonstrate properties of rapid devitrification and low viscosity at the liquids which would render them unsuitable for fiber-forming operations.

Figure 1:
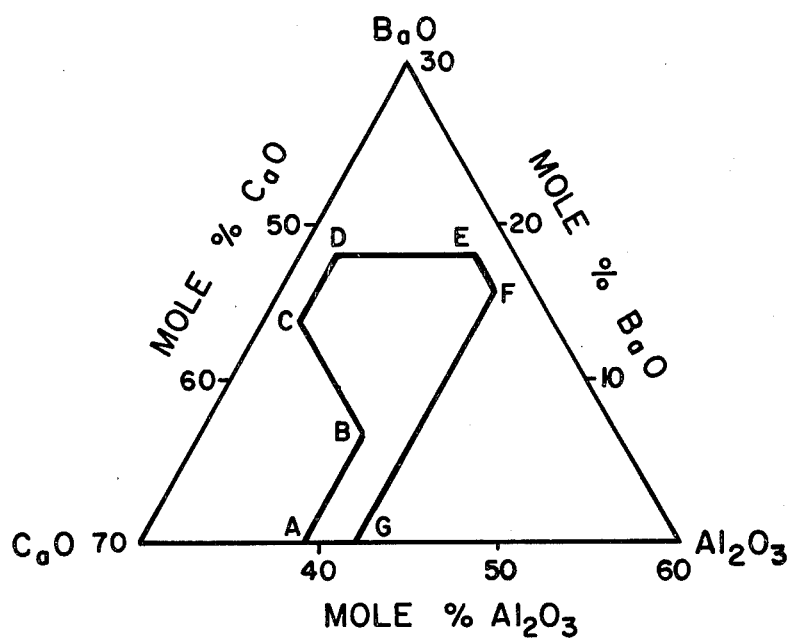
FIG. 1 of the DRAWING is a ternary phase diagram of part of the BaO-CaO-Al$_2$O$_3$ composition system wherein the polygon ABCDEFGA defines the composition region of the present invention.

I claim:

1. A composition for a glass which is composed, in mole percent on the oxide basis, of BaO, CaO and $Al_2O_3$ in proportions falling within the area or along the boundaries of the polygon ABCDEFGA shown in the $BaO-CaO-Al_2O_3$ ternary composition diagram comprising FIG. 1 of the DRAWING.

2. A composition according to claim 1 wherein BaO is present in an amount ranging from 4 to 18 mole percent, CaO is present in an amount ranging from 42 to 54 mole percent, and $Al_2 O_3$ is present in an amount ranging from 32 to 42 mole percent.

3. A composition according to claim 1 wherein BaO is present in an amount ranging from 0 to 7 mole percent, CaO is present in an amount ranging from 54 to 61 mole percent, and $Al_2 O_3$ is present in an amount ranging from 39 to 42 mole percent.

4. A fibrous glass which is composed, in mole percent on the oxide basis, of BaO, CaO and $Al_2O_3$ in proportions falling within the area or along the boundaries of the polygon ABCDEFGA shown in the $BaO-CaO-Al_2O_3$ ternary composition diagram comprising FIG. 1 of the DRAWING.

5. A fibrous glass according to claim 4 wherein BaO is present in an amount ranging from 4 to 18 mole percent, CaO is present in an amount ranging from 42 to 54 mole percent, and $Al_2O_3$ is present in an amount ranging from 32 to 42 mole percent.

6. A fibrous glass according to claim 4 wherein BaO is present in an amount ranging from 0 to 7 mole percent, CaO is present in an amount ranging from 54 to 61 mole percent, and $Al_2O_3$ is present in an amount ranging from 39 to 42 mole percent.

* * * * *